United States Patent Office 3,507,352
Patented Apr. 21, 1970

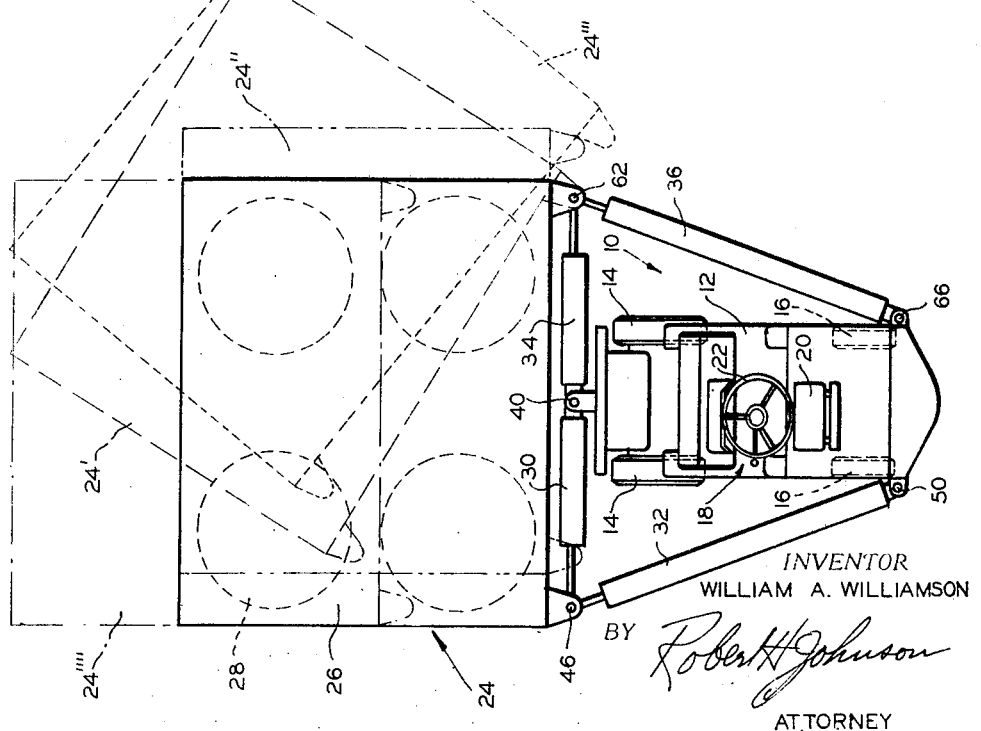

3,507,352
APPARATUS FOR MOVING AN AIR FILM PALLET OMNIDIRECTIONALLY RELATIVE TO A VEHICLE
William A. Williamson, Battle Creek, Mich., assignor to Clark Equipment Company, a corporation of Michigan
Filed Apr. 15, 1968, Ser. No. 721,221
Int. Cl. B60v 1/00
U.S. Cl. 180—119                                    4 Claims

ABSTRACT OF THE DISCLOSURE

A vehicle and an air film pallet connected by a plurality of fluid motors actuatable to move the pallet omnidirectionally reactive to the vehicle.

BACKGROUND OF THE INVENTION

The field of art to which this invention relates includes material handling apparatus.

A principal object of my invention is to provide simple apparatus for moving an air film pallet relative to a vehicle.

SUMMARY OF THE INVENTION

In carrying out my invention in a preferred embodiment I provide first and second extendible fluid motors adapted to be connected to a vehicle and an air film pallet and third and fourth extendible fluid motors adapted to be connected to the vehicle and air film pallet. The first and second fluid motors are connectible to a source of pressurized fluid to extend or retract simultaneously and the third and fourth fluid motors are connectible to the source of pressurized fluid to extend or retract simultaneously. Also, the first and third fluid motors are connectible to the source of pressurized fluid so that one of them extends while the other of them retracts.

The above and other objects, features and advantages of my invention will be more readily understood by persons skilled in the art when the detailed description is taken in conjunction with the drawing.

BRIEF DESCRIPTION OF THE DRAWING

FIGURE 1 is a plan view of a vehicle and an air film pallet embodying my invention and FIGURE 2 is a schematic diagram of my invention.

DESCRIPTION OF THE PREFERRED EMBODIMENT

Referring now to the drawing, the reference numeral 10 denotes generally an industrial truck or vehicle having a body 12 which is supported by a pair of front drive wheels 14 and a pair of rear dirigible wheels 16. Located on body 12 is an operator's station 18 which includes a seat 20, a steering control wheel 22 and various other controls conveniently located.

Located forwardly of truck 10 is an air film pallet 24 of the type described in patent application, Ser. No. 503,175, filed Oct. 23, 1965, now U.S. Patent No. 3,392,800. Pallet 24 includes a platform 26 and attached to the underside of platform 26 a plurality of inflatable air pads 28. In operation pallet 24 may be inserted beneath a load and the pads 28 inflated so that they elevate platform 26 slightly and lift the load clear of the supporting surface.

Because pads 28 have a film of air disposed between them and the supporting surface when pallet 24 is being used to transport a load, pallet 24 can be moved omnidirectionally over the supporting surface since it will slide on the film of air between pads 28 and the supporting surface.

In order to facilitate handling of loads (which may be loaded 20-foot containers weighing 30,000 pounds each) carried on pallet 24 it is desirable to be able to move pallet 24 omnidirectionally relative to truck 10 which is used to supply the tractive force to move pallet 24 from one location to another.

The apparatus for moving pallet 24 omnidirectionally relative to truck 10, and also connecting pallet 24 to truck 10, includes four double-acting piston and cylinder type fluid motors 30, 32, 34 and 36. Fluid motor 30 includes a cylinder 38 pivotally connected at the head end thereof to truck 10, as shown, by a pin and bracket connection 40, a piston 42 slidably disposed in cylinder 38 and a piston rod 44 which is connected to piston 42, rod 44 being pivotally connected at the outer end thereof to pallet 24 by means of a pin and bracket connection 46. Motor 32 includes a cylinder 48 pivotally connected at the head end thereof to truck 10 by means of a pin and bracket connection 50, a piston 52 slidably disposed in cylinder 48 and a piston rod 54 connected to piston 52, the outer end of which is pivotally connected to pallet 24 by means of pin and bracket connection 46. At this point it will be seen that motors 30 and 32 are disposed in triangular relationship since the other ends of rods 44 and 54 are pivotally connected to pallet 24 on the common axis of pin and bracket connection 46.

Fluid motor 34 includes a cylinder 56 which is pivotally connected at the head end thereof to truck 10 by means of pin and bracket connection 40, a piston 58 slidably disposed in cylinder 56 and a piston rod 60 connected to piston 58, the outer end of which is pivotally connected to pallet 24 by means of a pin and bracket connection 62. It should be noted that cylinders 38 and 56 are pivotally connected to truck 10 on the common axis of pin and bracket connection 40. Motor 36 includes a cylinder 64, the head end of which is pivotally connected to truck 10 by means of a pin and bracket connection 66, a piston 68 slidably disposed in cylinder 64 and a piston rod 70 connected to piston 68, the outer end of which is pivotally connected to pallet 24 by means of pin and bracket connection 62. Again, it will be noted that motors 34 and 36 are disposed in generally triangular relation with the rods 60 and 70 being pivotally connected to pallet 24 on the common axis of pin and bracket connection 62.

Carried by truck 10 is a source of pressurized fluid or pump 72 which is disposed in a conduit 74 and functions to draw fluid from fluid reservoir 76 and supply pressurized fluid to a feeder conduit 78. Pressurized fluid from pump 72 can be supplied to various pairs of the fluid motors in order to move pallet 24 relative to truck 10.

Fluid motors 30 and 32 can be actuated to either extend or retract simultaneously. The means for accomplishing this includes a four-way open-center valve 80 connected to feeder conduit 78 and connected to reservoir 76 by means of a return conduit 82. A conduit 84 is connected at one end thereof to valve 80 and at the other end thereof to the head end of cylinder 38 of motor 30. Disposed in conduit 84 is cylinder 48 of motor 32 and a pilot-operated check valve 86 which is disposed between cylinders 38 and 48. Also, a fluid conduit 88 is connected at one end thereof to valve 80 and at the other end thereof to the rod end of cylinder 38 of motor 30. Disposed in conduit 88 is the rod end of cylinder 48 of motor 32 and a pilot-operated check valve 90 which is located between cylinders 38 and 48.

Pilot-operated check valves 86 and 90 are conventional. Valve 86 functions to permit free fluid flow from the direction of cylinder 48 toward cylinder 38 in conduit 84 and permits fluid flow from the direction of cylinder 38 toward cylinder 48 only when there is pressurized fluid in conduit 88. Similarly, valve 90 permits free fluid flow in conduit 88 in the direction from cylinder 48 to cylinder 38 and permits fluid flow in the direction from cylinder 38 to cylinder 48 only when there is pressurized fluid in conduit 84.

It will now be apparent that when valve 80 is in the position shown that motors 30 and 32 are hydraulically locked so that connection 46 is fixed relative to truck 10. By actuating valve 80 so that conduit 84 is connected to conduit 78 and conduit 88 is connected to conduit 82 pressurized fluid will be supplied to the head ends of cylinders 38 and 48, causing fluid motors 30 and 32 to extend simultaneously. Conversely, if valve 80 is actuated so that conduit 88 is connected to conduit 78 and conduit 84 is connected to conduit 82 pressurized fluid will be supplied to the rod ends of cylinders 38 and 48, causing fluid motors 30 and 32 to retract simultaneously.

The arrangement for actuating fluid motors 34 and 36 to extend or retract simultaneously is the same as the arrangement for actuating fluid motors 30 and 32 simultaneously and includes an open-center four-way valve 92 connected to feeder conduit 78 and to reservoir 76 by means of a return conduit 94. A conduit 96 is connected at one end thereof to valve 92 and at the other end thereof to the head end of cylinder 56 of fluid motor 34. Disposed in conduit 96 is the head end of cylinder 64 and a pilot-operated check valve 98 which is located between cylinders 56 and 64. Also, a conduit 100 is connected at one end thereof to valve 92 and at the other end thereof to the rod end of cylinder 56 of motor 34. Disposed in conduit 100 is the rod end of cylinder 64 and a pilot-operated check valve 102 which is located between cylinders 56 and 64. Check valve 98 and 102 are conventional. Check valve 98 functions to permit free fluid flow in conduit 96 in the direction from cylinder 64 to cylinder 56 and prevents fluid flow in the direction from cylinder 56 to cylinder 64 unless there is pressurized fluid in conduit 100. Similarly, check valve 102 permits free fluid flow in conduit 100 in the direction from cylinder 64 to cylinder 56 and prevents fluid flow in the direction from cylinder 56 to cylinder 64 unless there is pressurized fluid in conduit 96. Thus, when valve 92 is in the position shown, fluid motors 34 and 36 are hydraulically locked so that the location of connection 62 is fixed relative to truck 10. By actuating valve 92 to connect conduit 96 with conduit 78 and connect conduit 100 with conduit 94 pressurized fluid is supplied to the head ends of motors 34 and 36 so that they are caused to extend. On the other hand, if valve 92 is actuated so that conduit 96 is connected to conduit 94 and conduit 100 is connected to conduit 78 pressurized fluid is supplied to the rod ends of motors 34 and 36, thereby causing them to retract.

Fluid motor 30 can be actuated to retract while fluid motor 34 is actuated to extend simultaneously or vice versa by means of an open-center four-way valve 104 which is connected to fluid conduit 78 and return conduit 82 by means of conduits 106 and 108, respectively. The rod end of cylinder 38 of motor 30 and the head end of cylinder 56 of motor 34 are connected by means of a fluid conduit 110 which is connected at one end thereof to conduit 88 between cylinder 38 and check valve 90 and at the other end thereof to conduit 96 between cylinder 56 and check valve 98. Conduit 110 also is connected to valve 104 by means of a conduit 112. Similarly, the head end of cylinder 38 of motor 30 and the rod end of cylinder 56 of motor 34 are connected by a conduit 114, one end of which is connected to conduit 84 between cylinder 38 and check valve 86 and the other end of which is connected to conduit 100 between cylinder 56 and check valve 102. Conduit 114 also is connected to valve 104 by means of a conduit 116. Thus, when valve 104 is actuated so that conduit 112 is connected to conduit 106 and conduit 116 is connected to conduit 108 pressurized fluid is supplied to conduit 110, thereby causing fluid motor 30 to retract and fluid motor 34 to extend simultaneously. When valve 104 is actuated to connect conduit 112 with conduit 108 and connect conduit 116 with conduit 106 pressurized fluid is supplied to conduit 114 so that fluid motor 30 is actuated to extend and fluid motor 34 is actuated to retract simultaneously.

In order to enable persons skilled in the art to better understand my invention, I will now explain the operation of it. It will be assumed that pallet 24 is disposed relative to truck 10 as shown in FIG. 1 and that it is desired to pivot the left side of pallet 24 away from truck 10 about pivotal connection 62 to the dotted outline position shown at 24'. In order to accomplish this the operator actuates valve 80 so that conduit 84 is connected to conduit 78 and conduit 88 is connected to conduit 82, whereby pressurized fluid is supplied to the head ends of motors 30 and 32, causing them to extend. If it is desired to shift pallet 24 to the right relative to truck 10 to the dotted outline position shown at 24", the operator actuates valve 104 to connect conduit 112 with conduit 106 and conduit 116 with conduit 108 so that pressurized fluid is supplied to motors 30 and 34, causing motor 34 to extend and motor 30 to retract simultaneously. As pallet 24 is shifted sideways to the right it also will tend to pivot slightly clockwise because motors 32 and 36 are hydraulically locked. In order to correct for this clockwise pivoting after sidewise movement the operator actuates valves 80 and 92 to pivot pallet 24 in a counterclockwise direction. If the operator desires to shift pallet 24 relative to truck 10 to the dotted outline position shown at 24''' the operator has to actuate all three of valves 80, 92 and 104 so that pallet 24 is shifted toward the right, the lower right corner of pallet 24 is shifted downwardly and the lower left corner of pallet 24 is shifted upwardly. Finally, pallet 24 can be shifted away from truck 10 to the position shown in dotted outline at 24'''' by actuating valves 80 and 92 simultaneously so that fluid motors 30, 32, 34 and 36 all extend simultaneously. Obviously, the pallet 24 can be returned to the solid outline position shown in FIG. 1 from any of the shifted positions simply by reversing the procedure used to position the pallet in the shifted position. Further, pallet 24 can be pivoted toward the left as well as toward the right, although this portion of the operation has not been described since it is felt to be obvious from the description of the operation for shifting of the pallet toward the right.

While only a single preferred embodiment of my invention has been described in the detailed description, it will be understood that this description is intended to be illustrative and that various changes and modifications can be made to my invention without departing from the spirit or scope of it.

I claim:
1. For use with an air film pallet and a vehicle having a source of pressurized fluid and a fluid reservoir, apparatus for moving the pallet relative to the vehicle comprising first, second, third and fourth double-acting piston and cylinder-type fluid motors, each motor being connected to the vehicle and the pallet, first means for actuating the said first and second motors to extend or retract simultaneously, second means for actuating the said third and fourth motors to extend or retract simultaneously and third means for actuating either the said first motor to extend and the said third motor to retract simultaneously or the said first motor to retract and the said third motor to extend simultaneously.

2. Apparatus as set forth in claim 1 wherein the said first and second motors have one of their ends connected to the pallet for pivotal movement about a common axis and the other of their ends connected to the vehicle for pivotal movement about separate axes and the said third and fourth motors have one of their ends connected to the pallet for pivotal movement about a common axis and the other of their ends connected to the vehicle for pivotal movement about separate axes, all of the said axes being substantially parallel.

3. Apparatus as set forth in claim 1 wherein the said first means includes a first four-way valve, a first fluid conduit connecting the said four-way valve and corresponding ends of the cylinders of the said first and second motors, a second fluid conduit connecting the said first four-way valve and the other ends of the said cylinders of the said first and second motors, the said first four-way valve being operable to connect the said first conduit to the source of pressurized fluid and connect the said second conduit to the fluid reservoir and vice versa, a first check valve disposed in the said first conduit and a second check valve disposed in the said second conduit, the said first check valve being operable to permit free fluid flow from the said first four-way valve in the said first conduit toward the said first and second motor cylinders and permit fluid flow in the said first conduit towards the said first four-way valve only when there is pressurized fluid in the said second conduit between the said first four-way valve and the said second check valve, the said second check valve being operable to permit free fluid flow from the said first four-way valve in the said second conduit toward the said first and second motor cylinders and permit fluid flow in the said second conduit toward the said first four-way valve only when there is pressurized fluid in the said first conduit between the said first four-way valve and the said first check valve, the said second means includes a second four-way valve, a third fluid conduit connecting the said second four-way valve and corresponding ends of the cylinders of the said third and fourth motors, a fourth fluid conduit connecting the said second four-way valve and the other ends of the cylinders of the said third and fourth motors, the said second four-way valve being operable to connect the said third conduit to the source of pressurized fluid and connect the said fourth conduit to the fluid reservoir and vice versa, a third check valve disposed in the said third conduit and a fourth check valve disposed in the said fourth conduit, the said third check valve being operable to permit free fluid flow from the said second four-way valve in the said third conduit toward the said third and fourth motor cylinders and permit fluid flow in the said third conduit towards the said second four-way valve only when there is pressurized fluid in the said fourth conduit between the said second four-way valve and the said fourth check valve, the said fourth check valve being operable to permit free fluid flow from the said second four-way valve in the said fourth conduit toward the said third and fourth motor cylinders and permit fluid flow in the said fourth conduit toward the said second four-way valve only when there is pressurized fluid in the said third conduit between the said second four-way valve and the said third check valve, and the third means includes a third four-way valve, a fifth conduit connecting one end of the said first motor cylinder and the correspondingly opposite end of the said third motor cylinder, a sixth fluid conduit connecting the other end of the said first motor cylinder and the correspondingly opposite end of the said third motor cylinder, a seventh conduit connecting the said fifth conduit with the said third four-way valve, and an eighth conduit connecting the said sixth conduit with the said third four-way valve, the said third four-way valve being operable to connect the said seventh conduit with the source of pressurized fluid and connect the said eighth conduit with the fluid reservoir and vice versa.

4. Apparatus as set forth in claim 3 wherein the said first and second motors have one of their ends connected to the pallet for pivotal movement about a common axis and the other of their ends connected to the vehicle for pivotal movement about separate axes and the said third and fourth motors have one of their ends connected to the pallet for pivotal movement about a common axis and the other of their ends connected to the vehicle for pivotal movement about separate axes, all of the said axes being substantially parallel.

References Cited

UNITED STATES PATENTS

| | | | |
|---|---|---|---|
| 2,454,566 | 11/1948 | Pfeiffer | 296—16 X |
| 2,557,066 | 6/1951 | Armington. | |
| 3,052,483 | 9/1962 | Petersen | 180—123 |
| 3,184,867 | 5/1965 | Symmank | 280—6.11 X |
| 3,174,630 | 3/1965 | Tantlinger et al. | |
| 3,220,698 | 11/1965 | Carder. | |

A. HARRY LEVY, Primary Examiner

U.S. Cl. X.R.

60—97; 91—411; 180—52, 79.2; 214—730